United States Patent
Ezell et al.

(10) Patent No.: US 10,320,972 B2
(45) Date of Patent: Jun. 11, 2019

(54) ENHANCED SESSION INITIATION PROTOCOL RECORDING

(71) Applicant: Avaya Inc., Santa Clara, CA (US)

(72) Inventors: Joel M. Ezell, Broomfield, CO (US); Manish Chatterjee, Calcutta (IN); Ananda Hp, Pune (IN); Sumit Bijwe, Pune (IN)

(73) Assignee: Avaya Inc., Santa Clara, CA (US)

( * ) Notice: Subject to any disclaimer, the term of this patent is extended or adjusted under 35 U.S.C. 154(b) by 421 days.

(21) Appl. No.: 14/806,927

(22) Filed: Jul. 23, 2015

(65) Prior Publication Data

US 2017/0026512 A1 Jan. 26, 2017

(51) Int. Cl.
| | |
|---|---|
| *H04M 3/42* | (2006.01) |
| *H04M 3/51* | (2006.01) |
| *H04M 7/00* | (2006.01) |
| *H04M 7/12* | (2006.01) |
| *H04L 29/06* | (2006.01) |
| *H04M 3/493* | (2006.01) |

(52) U.S. Cl.
CPC .... *H04M 3/42221* (2013.01); *H04L 65/1006* (2013.01); *H04M 3/493* (2013.01); *H04M 3/51* (2013.01); *H04M 7/006* (2013.01); *H04M 7/127* (2013.01)

(58) Field of Classification Search
CPC .......... H04L 12/2602; H04L 29/06027; H04L 43/00; H04L 65/1006; H04L 65/1083; H04L 65/1096; H04L 67/14; H04L 67/147; H04M 3/42221; H04M 3/493; H04M 3/5191
See application file for complete search history.

(56) References Cited

U.S. PATENT DOCUMENTS

| 7,412,521 | B2 * | 8/2008 | Olson | ............... H04L 29/06027 |
| | | | | 709/227 |
| 7,555,555 | B2 * | 6/2009 | Park | .................. H04L 29/06027 |
| | | | | 709/225 |

(Continued)

OTHER PUBLICATIONS

Hutton et al., RFC 7245: An Architecture for Media Recording Using the Session Initiation Protocol, May 2014, Internet Engineering Task Force (IETF).*

(Continued)

*Primary Examiner* — Eric Nowlin
(74) *Attorney, Agent, or Firm* — Sheridan Ross P.C.

(57) ABSTRACT

When a first SIP INVITE is received a Session Border Controller (SBC) to establish a communication session between communication devices, a second SIP INVITE message is also sent by the SBC to a media recorder without a media line or a media attribute set to inactive. The second SIP INVITE message without the media line or the media attribute set to inactive indicates that there is currently no media associated with the communication session to the media recorder. The SBC receives one of a SIP PUBLISH message or a SIP NOTIFY message that indicates whether to start or stop recording the voice or video communication session. The SBC sends or does not send a media stream of the communication session between the communication devices based on whether the SIP PUBLISH or the SIP NOTIFY indicates whether to start or stop recording the voice or video communication session.

20 Claims, 5 Drawing Sheets

(56) References Cited

U.S. PATENT DOCUMENTS

| | | | | |
|---|---|---|---|---|
| 7,707,286 B2* | 4/2010 | Gundu | H04W 8/005 | 709/224 |
| 8,023,979 B2* | 9/2011 | Sung | H04W 8/186 | 455/518 |
| 8,024,470 B2* | 9/2011 | Olson | H04L 29/06027 | 709/227 |
| 8,121,282 B1* | 2/2012 | Zhuang | H04L 65/1083 | 379/211.02 |
| 8,402,146 B2* | 3/2013 | Olson | H04L 29/06027 | 709/227 |
| 8,594,296 B2* | 11/2013 | Stucker | H04M 3/42374 | 370/259 |
| 9,160,608 B2* | 10/2015 | Carter | H04L 65/1043 | |
| 9,432,239 B2* | 8/2016 | Olson | H04L 29/06027 | |
| 9,521,203 B2* | 12/2016 | Carter | H04L 65/1043 | |
| 9,832,627 B2* | 11/2017 | Thakur | H04W 4/16 | |
| 9,992,331 B2* | 6/2018 | Chatterjee | H04M 3/42221 | |
| 2004/0205192 A1* | 10/2004 | Olson | H04L 29/06027 | 709/227 |
| 2005/0124326 A1* | 6/2005 | Belkin | H04W 4/16 | 455/414.1 |
| 2005/0125543 A1* | 6/2005 | Park | H04L 29/06027 | 709/227 |
| 2006/0172753 A1* | 8/2006 | Sung | H04W 4/10 | 455/518 |
| 2006/0234744 A1* | 10/2006 | Sung | H04W 8/186 | 455/518 |
| 2007/0041528 A1* | 2/2007 | Menon | H04L 29/06 | 379/90.01 |
| 2007/0143858 A1* | 6/2007 | Hearty | H04L 63/00 | 726/27 |
| 2007/0288621 A1* | 12/2007 | Gundu | H04W 8/005 | 709/223 |
| 2008/0146208 A1* | 6/2008 | Ejzak | H04L 12/66 | 455/416 |
| 2008/0186921 A1* | 8/2008 | Long | H04W 8/12 | 370/331 |
| 2009/0177784 A1* | 7/2009 | Olson | H04L 29/06027 | 709/228 |
| 2009/0190577 A1* | 7/2009 | Allen | H04L 65/1016 | 370/352 |
| 2009/0213839 A1* | 8/2009 | Davis | H04L 12/2602 | 370/352 |
| 2010/0310056 A1* | 12/2010 | Perlmutter | H04M 3/42221 | 379/85 |
| 2010/0329243 A1* | 12/2010 | Buckley | H04W 48/18 | 370/352 |
| 2010/0329244 A1* | 12/2010 | Buckley | H04W 76/026 | 370/352 |
| 2011/0093542 A1* | 4/2011 | Lau | H04L 65/1083 | 709/206 |
| 2011/0231560 A1* | 9/2011 | Mahendran | H04L 65/1086 | 709/228 |
| 2012/0084447 A1* | 4/2012 | Olson | H04L 29/06027 | 709/227 |
| 2012/0303831 A1* | 11/2012 | Toshniwal | H04L 65/1016 | 709/229 |
| 2013/0039225 A1* | 2/2013 | Dahl | H04L 12/14 | 370/259 |
| 2013/0067105 A1* | 3/2013 | Balaji | H04Q 3/0029 | 709/230 |
| 2013/0177011 A1* | 7/2013 | Carter | H04L 65/1043 | 370/352 |
| 2013/0188649 A1* | 7/2013 | Carter | H04L 65/1043 | 370/400 |
| 2014/0040484 A1* | 2/2014 | Olson | H04L 29/06027 | 709/227 |
| 2014/0188475 A1* | 7/2014 | Lev-Tov | G06F 17/30389 | 704/254 |
| 2016/0072897 A1* | 3/2016 | Carter | H04L 65/1043 | 370/400 |
| 2016/0248814 A1* | 8/2016 | Mufti | H04L 65/1006 | |
| 2016/0323728 A1* | 11/2016 | Thakur | H04W 4/16 | |
| 2017/0026512 A1* | 1/2017 | Ezell | H04M 3/42221 | |
| 2017/0064075 A1* | 3/2017 | Chatterjee | H04M 3/42221 | |
| 2017/0099323 A1* | 4/2017 | Sandgren | H04L 65/1006 | |

OTHER PUBLICATIONS

Rehor et al., RFC 6341: Use Cases and Requirements for SIP-Based Media Recording (SIPREC), Aug. 2011, Internet Engineering Task Force (IETF).*

RFC 3903 (Niemi et al., RFC 3903: Session Initiation Protocol (SIP) Extension for Event State Publication, Oct. 2004, The Internet Society).*

RFC 6665 (Roach, RFC 6665: SIP-Specific Event Notification, Jul. 2012, Internet Engineering Task Force (IETF).*

* cited by examiner

ENHANCED SESSION INITIATION PROTOCOL RECORDING

TECHNICAL FIELD

The systems and methods disclosed herein relate to call recording and in particular to call recording in a Session Initiation Protocol (SIP) environment.

BACKGROUND

Recording a call when the call enters an enterprise, such as a corporate network, has an advantage over other solutions. One advantage is that the media stream of a call can be forked at a Session Border Controller (SBC). The advantage of using a SBC is that all incoming/outgoing calls have to traverse the SBC. This provides enhanced security for recording a media stream. In a SIP environment, call recording is typically based on the Internet Engineering Task Force (IETF) RFC 6341, the entire contents of which are hereby incorporated herein by reference. In addition, (IETF) RFCs 6665 (July 2012) and 3903 (October 2004) disclose the use of standard SIP messaging, which are also incorporated herein in their entirety by reference. However, the solution proposed in the IETF RFC 6341 has problems when selective recording needed. When a media stream enters the enterprise at the SBC, the media stream is always streamed to a media recorder. This works fine when all calls are being recorded. However, if an individual call is not being recorded, the media is still streamed to the media recorder. This results in the sending of unnecessary media streams to the media recorder.

SUMMARY

Systems and methods are provided to solve these and other problems and disadvantages of the prior art. To limit the sending of unrecorded media streams, when a first SIP INVITE is received by a Session Border Controller (SBC) to establish a communication session between communication devices, a second SIP INVITE message is also sent by the SBC to a media recorder without a media line or a media attribute set to inactive. The second SIP INVITE message without the media line or the media attribute set to inactive indicates that there is currently no media associated with the communication session to the media recorder. The SBC receives one of a SIP PUBLISH message or a SIP NOTIFY message that indicates whether to start or stop recording the voice or video communication session. The SBC sends or does not send a media stream of the communication session between the communication devices based on whether the SIP PUBLISH or the SIP NOTIFY indicates whether to start or stop recording the voice or video communication session.

In another embodiment, a media recording application sends a SIP SUBSCRIBE message to be notified of an event associated with a User Agent (UA). The media recording application receives a SIP NOTIFY message that indicates the detection of an event associated with the UA. In response, a media recorder receives a media stream for a communication session that includes the UA. The media recorder records the media stream of the communication session.

DETAILED DESCRIPTION

Figure 1:
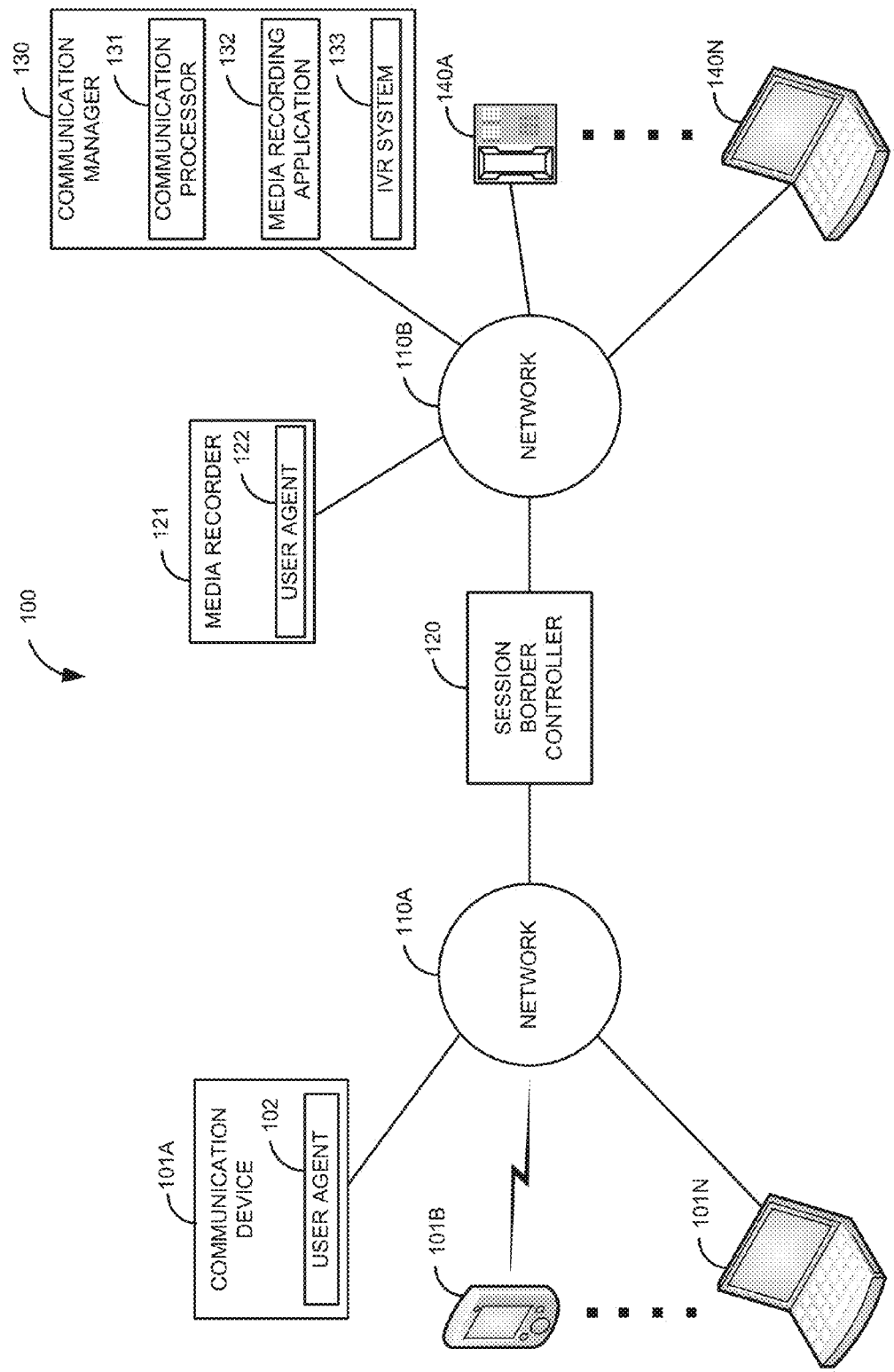
FIG. 1 is a block diagram of a first illustrative system for managing media recording at a Session Border Controller (SBC).

FIG. 1 is a block diagram of a first illustrative system 100 for managing media recording at a Session Border Controller (SBC) 120. The first illustrative system 100 comprises communication devices 101A-101N, communication networks 110A-110B, the SBC 120, a media recorder 121, a communication manager 130, and agent terminals 140A-140N. The first illustrative system 100 is for of an exemplary call center environment. However, the first illustrative system may be implemented a non-call center environment where the agent terminals 140A-140N are communication devices 101 for users.

The communication devices 101A-101N can be or may include any device that can communicate on the communication network 110A, such as a Personal Computer (PC), a telephone, a video system, a cellular telephone, a Personal Digital Assistant (PDA), a tablet device, a notebook device, a smart phone, a media server, and/or the like. As shown in FIG. 1, any number of communication devices 101A-101N may be connected to the communication network 110A, including only a single communication device 101.

The communication device 101A further comprises a User Agent (UA) 102. The UA 102 can be or may include any hardware/software that can handle SIP messages for the communication device 101A. Although the communication devices 101B-101N are not shown comprising a UA 102, each of the communication devices 101B-101N can also include a respective UA 102. In some embodiments, the UA 102 may process messages for other types of communication sessions, such as video protocols, H.323. Web Real-Time Communication (WebRTC) protocol and/or the like.

The communication networks 110A-110B can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The communication networks 110A-110B can use a variety of electronic protocols, such as Ethernet, Internet Protocol (IP), Session Initiation Protocol (SIP), Integrated Services Digital Network (ISDN), Real-Time Protocol (RTP), and/or the like. Thus, the communication networks 110A-110B are electronic communication networks configured to carry messages via packets and/or circuit switched communications. In a typical environment, the communication network 110A is a public network, such as the Internet and the communication network 110B is a private network, such as a corporate or enterprise network.

The SBC 120 can be or may include any hardware/ software that can provide security services for the communication network 110B, such as a firewall, a gateway, a Network Address Translator (NAT), and/or the like. The SBC 120 has the ability to fork any number media streams for call recording.

The media recorder 121 can be any device that can record a media stream. The media recorder 121 can record a digital media stream and/or an analog media stream. The media recorder 121 can record a video media stream, an audio media stream, a text media stream (e.g., an Instant Messaging media stream), and/or the like. The media recorder 121 may record a portion of a media stream. The media recorder 121 may record any number of media streams. The media recorder 121 may run on a media recording server.

The media recorder 121 also includes a user agent 122. The user agent 122 can be similar to the user agent 102. The user agent 122 can process SIP messages for recording a media stream.

The communication manager 130 can be any hardware coupled with software that can manage communications, such as a Private Branch Exchange (PBX), a proxy server, a router, a call processor, a network switch, a central office switch, and/or the like. The communication manager 130 further comprises a communication processor 131, a media recording application 132, and an Interactive Voice Response (IVR) system 133.

The communication processor 131 can be any processor that can process communications, such as, a microprocessor, a Digital Signaling Processor (DSP), a microcontroller, and/or the like. The communication processor 131 is typically coupled with firmware and/or software to process communications.

The media recording application 132 can be or may include any hardware/software that can manage how media sessions are recorded. The media recording application 132 may have a user interface that allows an administrator to determine specific media sessions to record. For example, the administrator can elect to record all media streams for a specific UA 102, record all media streams for a specific user, record all media streams for a contact center, record a media based on an address, such as a telephone number, record a media stream based on a word or phrase spoken in the media stream, record a video stream based on a gesture in a video call, record an Instant Messaging stream based on a word or phrase sent in the IM stream, record a media stream based on a call transfer, record a media stream based on call forking, record a media stream based on a conference call, record a media stream based on a conference call with a specific user, record a media stream based on a type of media stream, record a media stream based on a group of agents in a contact center, record a media stream based on a specific agent, record a media stream based on a product supported by a group of agents in the contact center, record a media stream based on information selected by the user from the IVR system 133, record a media stream based on an address range, record a media stream based on a Dual Tone Multi-Frequency (DTMF) tone, record a media stream based on a call to a specific number, and/or the like.

The IVR system 133 can be or may include any hardware/software that can interact with a person. The IVR system 133 can present different selections for a user to select. For example, the IVR system 133 may be a front end to a contact center, which enables a customer to select a specific service or product supported by the contact center. The IVR system 133 may be a means for a user to select recording of a media stream of a communication session. The IVR system 133 may also function as a video IVR system 133 that can take input from a user in a video call.

The agent terminals 140A-140N can be any device that can be used in a communication session, such as a communication device 101. The agent terminals 140A-140N may comprise a plurality of communication devices 101, such as a telephone and a personal computer that is used by an agent in a contact center. Although not shown, the agent terminals 140A-140N can also include a user agent 102.

Figure 2:
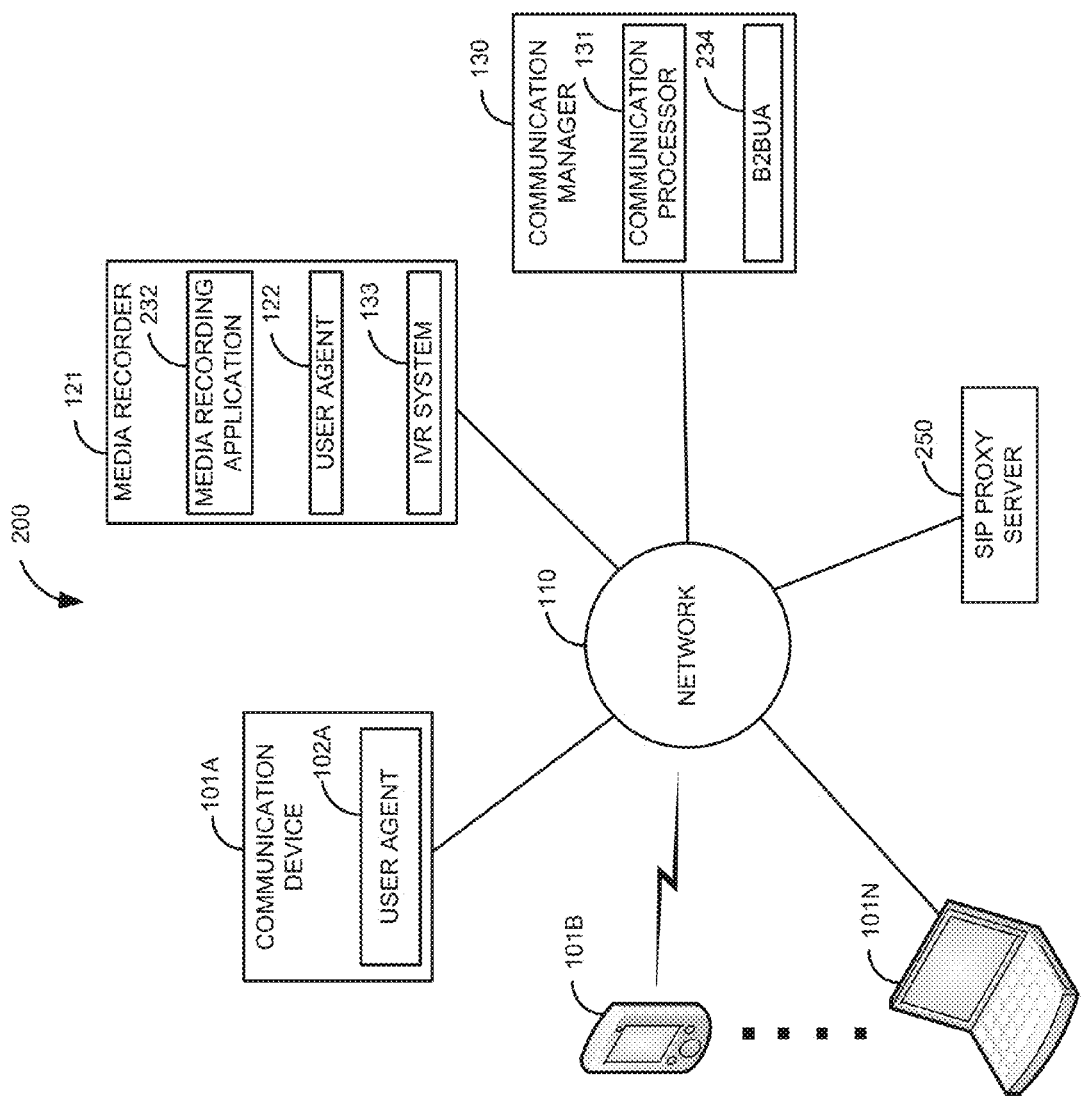
FIG. 2 is a block diagram of a second illustrative system for managing media recording with a Back-to-Back User Agent (B2BUA).

FIG. 2 is a block diagram of a second illustrative system 200 for managing media recording with a Back-to-Back User Agent (B2BUA) 234. The second illustrative system 200 comprises the communication devices 101A-101N, the communication network 110, the media recorder 121, the communication manager 130, and a SIP proxy server 250.

In this embodiment, the media recorder 121 includes a media recording application 232, the user agent 122, and the IVR system 133. The media recording application 232 is similar to the media recording application 132. In this embodiment, the media recording application 232 may include additional features and/or different features from the media recording application 132.

The communication manager 130 further comprises the communication processor 131 and a B2BUA 234. The B2BUA 234 is an application that gets inserted into the signaling stream and/or media stream of a communication session. For example, the B2BUA 234 can be inserted into each media stream of each communication session (or a subset of the communication sessions) in order to facilitate recording of a media stream.

The SIP proxy server 250 may be or can include any hardware/software that can provide communication services for the communication devices 101A-101N. The SIP proxy server 250 is shown in FIG. 2 as being separate from the communication manager 130. However, in another embodiment, the SIP proxy server 250 is part of the communication manager 130 or vice versa.

Figure 3:
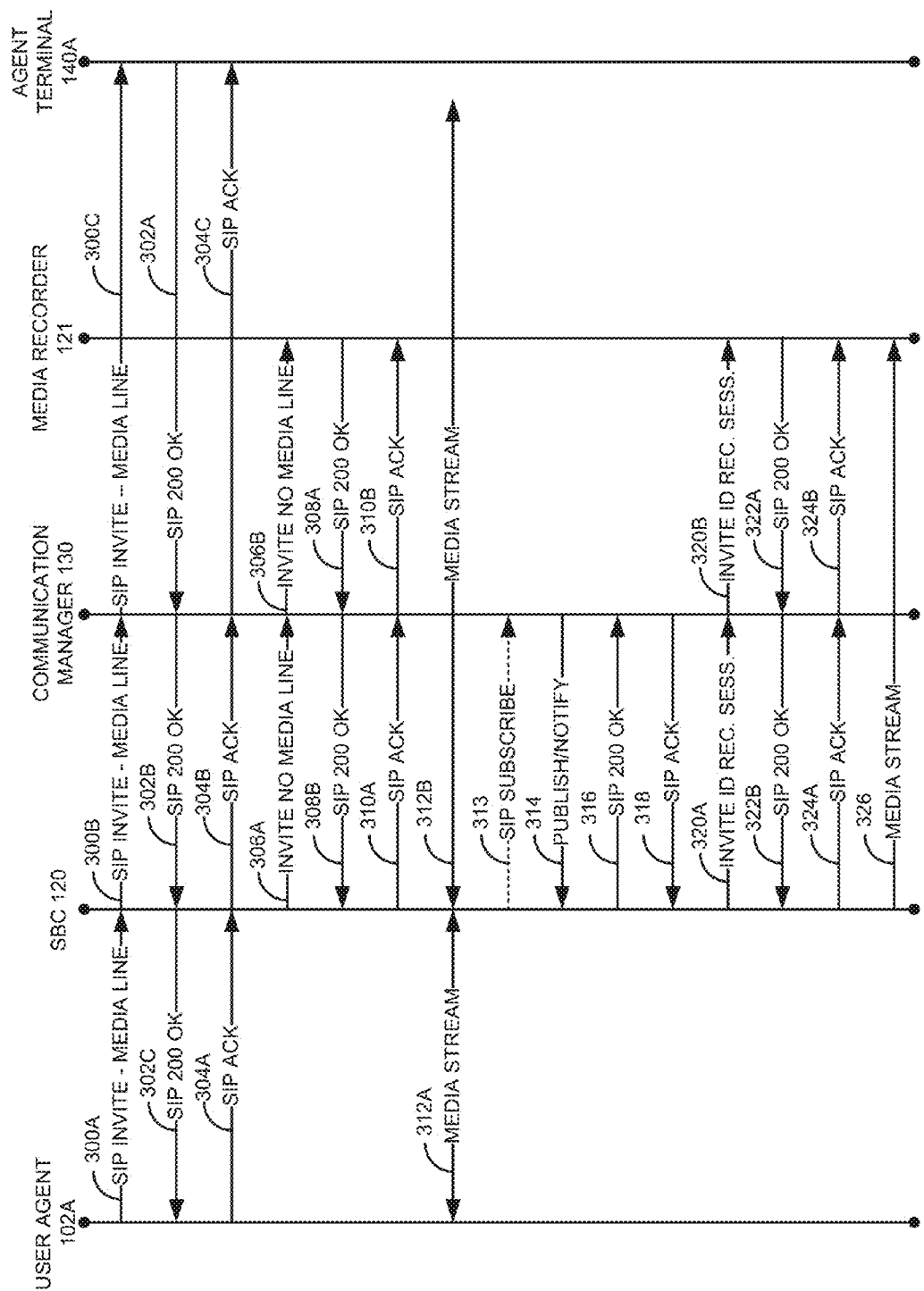
FIG. 3 is a flow diagram of a process for managing media recording at a SBC.
Figure 4:
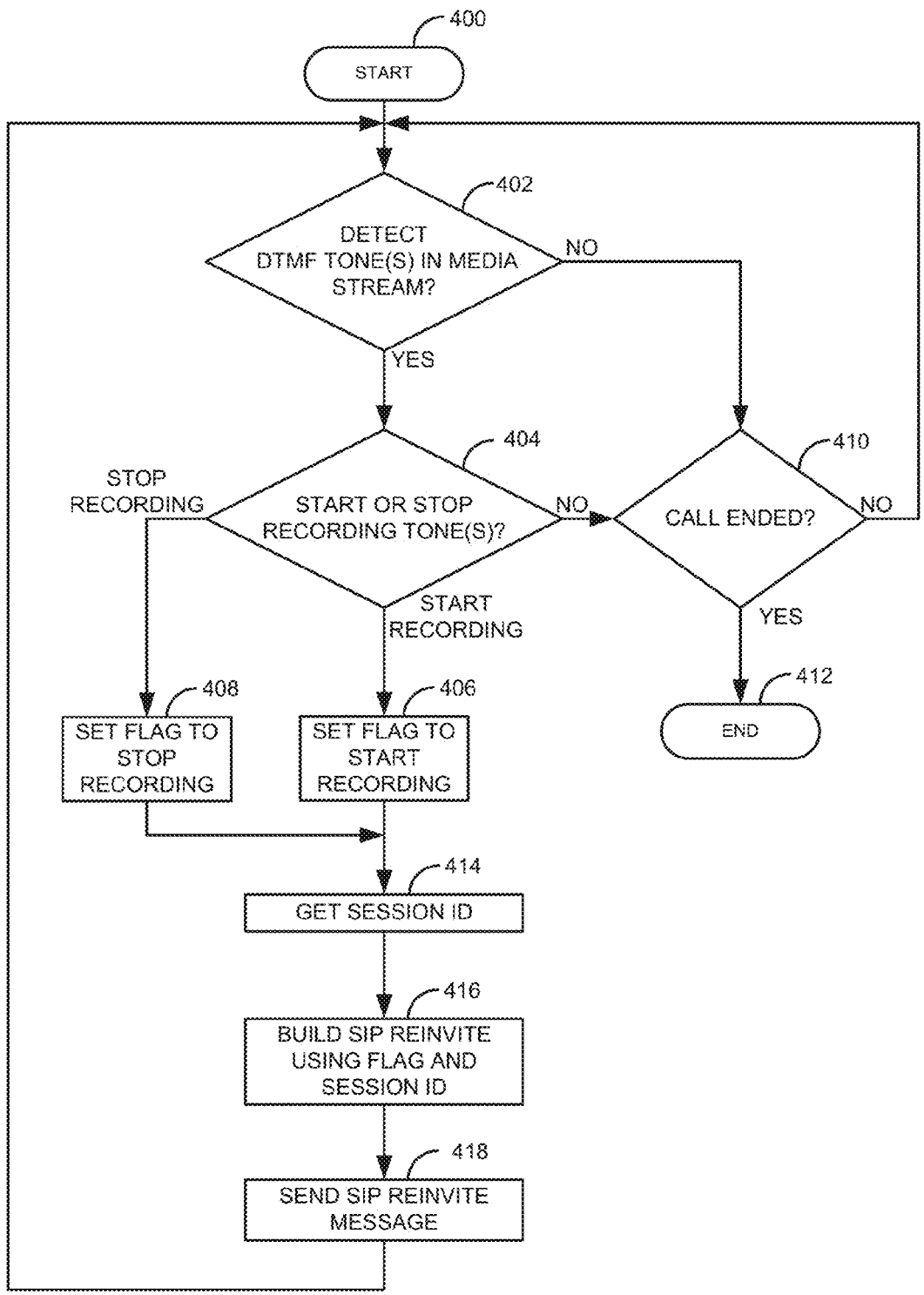
FIG. 4 is a flow diagram of a process for detecting Dual Tone Multi-Frequency (DTMF) to start or stop a call recording.
Figure 5:
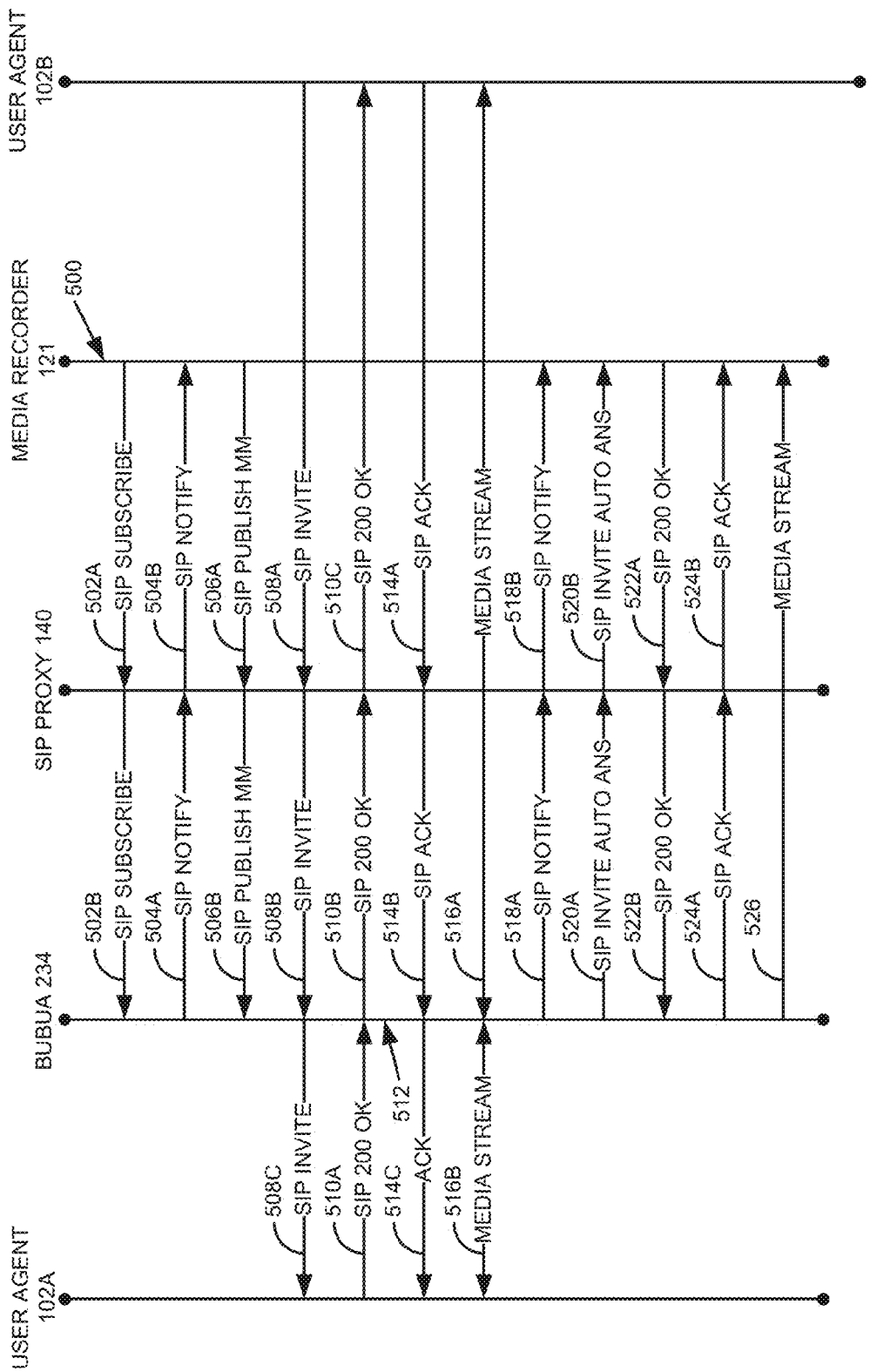
FIG. 5 is a flow diagram of a process for managing a media recording with a B2BUA.

FIG. 3 is a flow diagram of a process for managing media recording at a SBC 120. Illustratively, the communication devices 101A-101N, the user agent 102, the SBC 120, the media recorder 121, the user agent 122, the communication manager 130, the communication processor 131, the media recording application 132, the IVR system 133, the agent terminals 140A-140N, the media recording application 232, the B2BUA 234, and the SIP proxy server 250 are stored-program-controlled entities, such as a computer or processor, which performs the method of FIGS. 3-5 and the processes described herein by executing program instructions stored in a non-transitory computer readable storage medium, such as a memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation. The process of FIG. 3 is based on the embodiment described in FIG. 1.

The process starts in step 300A when the user agent 102 in the communication device 101A sends a SIP INVITE message with a media line to establish a communication session to an agent in a contact center. For example, when a user of the communication device 101A makes a call to a 1-800 number of a call center. In one embodiment, the SIP INVITE message may be a direct communication session to an agent at an agent terminal 140. A media line is where the SIP INVITE message includes media lines that describe the type of media that will be used in the communication session. This is typically conveyed by using the Session Description Protocol (SDP). For example, using SDP, the SDP lines can include information on a codec for the communication session, the type of media (e.g., voice, video, or text), the type of protocol that will be used to send the media (e.g., Real-Time Protocol (RTP), and the like.

The SIP INVITE message of step 300A is received by the SBC 120. The SBC 120 sends the SIP INVITE message with the media lines in step 300B to the communication manager 130 in step 300B. The communication manager 130 sends the SIP INVITE message with the media lines to the agent terminal 140A in step 300C. For example, the SIP INVITE message of step 300C may be sent to the agent terminal 140A from a call center queue when the agent becomes available. Alternatively, the SIP INVITE message of step 300C may be sent directly to the agent terminal 140A.

The agent terminal 140A responds by sending a SIP 200 OK message to the communication manager 130 in step 302A. For example, the SIP 200 OK message is sent when the agent answers the phone (agent terminal 140A). The SIP 200 OK message is sent by the communication manager 130 to the SBC 120 in step 302B. The SBC 120 sends the SIP 200 OK message to the UA 102 in the communication device 101A in step 302C. The UA 102 in the communication device 101A responds by sending a SIP ACK message in step 304A to the SBC 120. The SBC 120 sends the SIP ACK message to the communication manager 130 in step 304B. The communication manager 130 sends the SIP ACK message to the agent terminal 140A in step 304C. At this point, the media stream of steps 312A-312B can be setup (e.g., using RTP) to stream media between the user agent 102 in the communication device 101A and the agent terminal 140A. For example, the media may be media for a video call between the communication device 101A and the agent terminal 140A.

In response to receiving the SIP INVITE message of step 300A, the SBC 120 also sends a SIP INVITE message with no media lines (e.g., no SDP information) to the communication manager 130 in step 306A. The SIP INVITE message of step 306A may also include meta-data identifying the media stream (i.e., that is setup in step 312). Alternatively the SIP INVITE message of step 300A may have a media line that indicates that the media is inactive. For example, the media line a=inactive may be sent to indicate that the media stream is inactive. The communication manager 130 sends the SIP INVITE message with no media lines or the inactive media line to the media recorder 121 in step 306B. The media recorder 121 responds by sending a SIP 200 OK message to the communication manager 130 in step 308A. The communication manager 130 sends the SIP 200 OK message to the SBC 120 in step 308B. The SBC 120 responds in step 310A by sending a SIP ACK message to the communication manager 130. The communication manager 130 sends the SIP ACK message to the media recorder 121 in step 310B. At this point a communication session has been established between the SBC 120 and the call recorder 121 without a media stream. The steps of 306-310 may occur after or intermixed with step 316.

The media recording application 132, in the communication manager 130, sends a SIP PUBLISH message or a SIP NOTIFY message to the SBC 120 in step 314. The process of sending a SIP PUBLISH message or a SIP NOTIFY message can vary based on implementation. In one embodiment, the media recording application 132 can send the SIP PUBLISH message to the SBC 120 based on an event. For example, an administrator of the media recording application 132 may setup an event to record any voice call from the user agent 102 in the communication device 101A. In this example, the SIP PUBLISH message of step 314 is sent before the SIP INVITE message of step 300A is sent. The SIP PUBLISH message indicates to the SBC 120 to start sending media as soon as the communication session between the SBC 120 and the media recorder 121 has been established (steps 306, 308, and 310).

Alternatively, the SIP PUBLISH message may be sent during the communication session as shown in FIG. 3. For example, where the event is based on the detection of a word or phrase spoken during the communication session (e.g., if an agent is using profanity during a call with a customer). In this example, the SIP PUBLISH message indicates to start sending the media stream to the media recorder 121 for the communication session established in step 306, 308, and 310.

In another embodiment, the SIP PUBLISH message may be a combination of the above two events. For example, the SIP PUBLISH message may indicate to record the media stream when the communication session begins. If the word or phrase is detected in the communication session, the recording is stored. Otherwise, if the word or phrase is not detected in the communication session, the recording is automatically deleted. This way, the whole communication session is recorded if the event occurs.

In one embodiment, the media recording application 132 may send a SIP PUBLISH message to an event state compositor (not shown). The event state compositor can then send a SIP NOTIFY message (based on a previous SIP SUBSCRIBE message sent by the SBC 120) to the media recording application 132.

In another embodiment, the SBC 120 can send the SIP SUBSCRIBE message of step 313 to the media recording application 132 based on the SIP INVITE of step 300A being received. Step 313 is not used if a SIP PUBLISH is sent in step 314 (indicated by the dashed lines). The media recorder 121 can then send the SIP NOTIFY message of step 314. The SIP NOTIFY message can indicate whether to start or stop sending media to the media recorder 121. For example, the SIP NOTIFY message can work for any of the events described previously.

Upon receipt of the SIP PUBLISH message or the SIP NOTIFY message in step 314, the SBC 120 sends a SIP 200 OK to the media recording application 132 in step 316. The media recording application 132 responds by sending a SIP ACK message to the SBC 120 in step 318.

The SBC 120 sends a SIP INVITE message that identifies the media session of step 312 to the media recorder 121 via the communication manager 130 in steps 320A-320B. The SIP INVITE of step 320A can include the SDP information. The media recorder 121 responds by sending a SIP 200 OK message to the SBC 120 via the communication manager 130 in steps 322A-322B. The SBC 120 responds by sending a SIP ACK message to the media recorder 121 via the communication manager 130 in steps 324A-324B.

The SBC 120 sends the media stream in step 326 if the SIP PUBLISH message or the SIP NOTIFY message indicates to send the media stream. For example, the SIP PUBLISH message (e.g., sent after the media stream is started in step 312A-312B) can indicate that media monitor=on for the UA 102 in the communication device 101A. At this point, the SBC 120 will send the media stream to the media recorder 121 in step 316. At a later point in the communication session, a second SIP PUBLISH message or SIP NOTIFY message may be received that indicates that the media monitor=off. The SBC 120 will then stop sending the media stream to the media recorder 121.

The above process is described using voice and video calls. However, the above process will also work for text media streams, such as Instant Messaging media streams. For example, using the Message Session Relay Protocol (MSRP) described in Network Working Group RFC 4975, which is incorporated herein by reference, a separate media path for an IM session can be sent through the SBC 120 and recorded using the above process.

In one embodiment, the communication session in steps 306, 308, and 310 are optionally setup. For example, the SIP INVITE of step 306 may not be sent based on an administered configuration of where a call between the UA 102 and the agent terminal 140A is not to be recorded. In another embodiment, steps 306, 308, and 310 are setup for each communication that traverses the SBC 120.

FIG. 4 is a flow diagram of a process for detecting Dual Tone Multi-Frequency (DTMF) to start or stop a call recording. The process starts in step 400 when a call (a communication session) is established. For example, a thread or daemon can be started for each call.

The SBC 120 determines if a DTMF tone(s) has been detected in the media stream in step 402. For example, once the call is established, the user may by able to enter a *7 to start recording a call and a *8 to stop recording the call. If a DTMF tone(s) has not been detected in step 402, the process goes to step 410. The process determines if the call has ended in step 410. If the call has ended in step 410, the process ends in step 412. Otherwise, if the call has not ended in step 410, the process goes back to step 402.

If a DTMF tone(s) has been detected in step 402, the SBC 120 determines in step 404 if the DTMF tone(s) are to start recording or stop recording a call. If the DTMF tone(s) are not to record or stop recording a call, the process determines if the call has ended in step 410.

If the DTMF tone(s) are to stop recording a call in step 404, SBC 120 sets a flag to stop recording in step 408 and the process goes to step 414. Otherwise, if the DTMF tone(s) are to start recording in step 408, the SBC 120 sets the flag to start recording in step 406. The SBC gets the session ID of the communication session in step 414 (e.g., the session ID for communication session established in steps 300-304). The SBC 120 builds a SIP REINVITE message using the flag and session ID in step 416. The SBC 120 sends the SIP REINVITE message to the media recorder 121 in step 418. The process then goes back to step 402. The SBC 120 then sends the media stream in step 326 if the flag is set to record or stops sending the media stream if the flag is set to stop recording.

FIG. 5 is a flow diagram of a process for managing a media recording with a B2BUA 234. The flow diagram of FIG. 5 is based on the embodiment described in FIG. 2. The process starts in step 500 when an administrator defines an event that will cause a media stream to be recorded. For example, the administrator may elect to record all media streams for a specific UA 102, record a media stream for a specific user, record a media stream based on an address, such as a telephone number, record a media stream based on a word or phrase spoken in the media stream, record a video stream based on a gesture in a video call, record a media stream based on a word or phrase sent in an Instant Messaging (IM) session, record a media stream based on a call transfer, a media stream based on call forking, record a media stream based on a conference call, record a media stream based on a conference call with a specific user, record a media stream based on a type of media stream, record a media stream based on a group of agents in a contact center, record a media based on a specific agent, record a media stream based on a product supported by a group of agents in the contact center, record a media stream based on information selected by the user from the IVR system 133, record a media stream based on an address range, record a media stream based on a Dual Tone Multi-Frequency (DTMF) tone, record a media stream based on a call to a specific number, and/or the like.

The media recording application 232 in the media recorder 121 sends a SIP SUBSCRIBE message to the B2BUA 234 via the SIP proxy server 250 in steps 502A-502B. The SIP SUBSCRIBE message indicates the particular event(s) that cause the B2BUA 234 to stream a media stream to the media recorder 121. For example, the SIP SUBSCRIBE may indicate that the B2BUA 234 is to send a media stream for recording a call to the media recorder 121 when a phrase is detected in the media stream of the call and stop recording the call when a second phrase is detected in the media stream of the call. The B2BUA 234 responds by sending a SIP NOTIFY message via the SIP proxy server 250 in steps 504A-504B. The SIP NOTIFY message of step 504A-504B can indicate that none of the events are currently occurring or indicate that one or more of the events are currently occurring.

The media recording application 232 sends a SIP PUBLISH message for media monitoring to the B2BUA 234 via the SIP proxy server 250 in steps 506A-506B. The SIP PUBLISH message of steps 506A-506B is to tell the B2BUA 234 to create a communication session between the B2BUA 234 and the media recorder 121 when the event(s) sent in the SIP SUBSCRIBE message of step 502 occurs.

The process described in steps 508-526 are based on a recording event of where the UA 102 in the communication device 101A accepts a communication session. One of skill in the art would recognize that the flow of FIG. 5 may vary based on different events. For example, any of the events described above. The process of steps 508-526 assume that the B2BUA 234 has been sequenced into the communication session between the UA 102 in the communication device 101A.

The UA 102 in the communication device 101B sends a SIP INVITE message to the UA 102 in the communication device 101A via the SIP proxy server 250 and the B2BUA 234 in steps 508A-508C. The UA 102 in the communication device 101A sends a SIP 200 OK to the UA 102 in the communication device 101B, via the B2BUA 234 and the SIP proxy server 250 in steps 510A-510C. The UA 102 in the communication device 101B sends a SIP ACK message to the UA 102 in the communication device 101A via the SIP proxy server 250 and the B2BUA 234 in steps 514A-514C. A media stream is then established between the UA 102 in the communication device 101A and the UA 102 in the communication device 101B, via the B2BUA 234 in steps 516A-516B (e.g., using Real-Time Protocol (RTP)).

The B2BUA 234, in step 512, detects that the UA 102 in the communication device 101A has accepted the communication session (e.g., the user of the communication device 101A answered the call) when the B2BUA 234 receives the SIP 200 OK message of step 510A. Since the UA 102 in the communication device 101A has accepted a communication session in step 512 (the event for which the media recording application 232 subscribed to in step 502), the B2BUA 234 sends a SIP NOTIFY message via the SIP proxy server 250 to the media recording application 232 indicating that the UA 102 in the communication device 101A has accepted a communication session in steps 518A-518B.

In addition, because of the SIP PUBLISH message received in step 506B, the B2BUA 234 sends a SIP INVITE message with auto answer to the media recording application 232 via the SIP proxy server 250 in steps 520A-520B.

The media recording application 232 responds by sending a SIP 200 OK message to the B2BUA 234 via the SIP proxy server 250 in steps 522A-522B. The B2BUA 234 responds by sending a SIP ACK to the media recording application 232 via the SIP proxy server 250 in steps 524A-524B. Since the media recording application 232 has been administered to record all calls answered by the UA 102 in the communication device 101A, the B2BUA 234 sends the media stream of the call to the call recorder 121 in step 526. The media stream is then recorded by the call recorder 121. If the SIP notify of step 518 was to stop recording, the media stream of step 516 would be discontinued.

In another embodiment, the media recording application 232 does not send the SIP PUBLISH message of steps 506A-506B, resulting in steps 520, 522, and 522 not occurring. Instead, when the SIP NOTIFY message of step 518B is received by the media recording application 232, the media recording application 232 initiates a communication session to the B2BUA 234 (not shown, but is the opposite of step 520, 522, and 524). The media recording application 232 sends a SIP INVITE message (with auto answer) to the B2BUA 234. The B2BUA 234 sends a SIP 200 OK message to the media recording application 232. The media recording application 232 sends a SIP ACK message to the B2BUA 234. The B2BUA 234 then sends the media stream as described in step 526.

The process described in FIG. 5 can also be used with the process of FIG. 4 of where DTMF tones are used to start and stop recording a call. In addition, the process of FIG. 5 can be used to record the media stream of an IM session.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving, by a processor, a first SIP INVITE message to establish a communication session between a first communication device and a second communication device;
   in response to receiving the first SIP INVITE message, sending, by the processor, a second SIP INVITE message to a media recorder, wherein the second SIP INVITE message is without a media line or has a media attribute set to inactive;
   receiving, by the processor, one of a SIP PUBLISH message or a SIP NOTIFY message that indicates to start recording the communication session; and
   sending, by the processor, a media stream of the communication session to the media recorder based on the SIP PUBLISH message or the SIP NOTIFY message indicating to start recording the communication session.

2. The method of claim 1, further comprising sending a third SIP INVITE message to the media recorder, wherein the third SIP INVITE message includes a session identifier of the communication session.

3. The method of claim 1, wherein the second SIP INVITE message has the media attribute set to inactive.

4. The method of claim 1, wherein the second SIP INVITE message is without the media line.

5. The method of claim 1, further comprising:
   receiving one or more Dual Tone Multi-Frequency (DTMF) tones in the communication session that indicates to either start or stop recording a voice or a video communication session; and
   sending a SIP REINVITE message in response to receiving the one or more DTMF tones.

6. The method of claim 1, wherein the one of the SIP PUBLISH message or the SIP NOTIFY message is the SIP NOTIFY message and further comprising:
   sending a SIP SUBSCRIBE message to a recording application, wherein the SIP SUBSCRIBE message is to subscribe to a recording event for the communication session.

7. The method of claim 1, wherein the one of the SIP PUBLISH message or the SIP NOTIFY message is the SIP PUBLISH message.

8. A system comprising:
   a microprocessor; and
   a computer readable medium, coupled with the microprocessor and comprising microprocessor readable and executable instructions that cause the microprocessor to execute:
   a Session Border Controller (SBC) that receives a first SIP INVITE message to establish a communication session between a first communication device and a second communication device, sends a second SIP INVITE message to a media recorder in response to receiving the first SIP INVITE message, wherein the second SIP INVITE message is without a media line or has a media attribute set to inactive, receives one of a SIP PUBLISH message or a SIP NOTIFY message that indicates to start recording the communication session, and further indicates to send a media stream of the communication session to the media recorder based on the SIP PUBLISH message or the SIP NOTIFY message indicating to start recording the communication session.

9. The system of claim 8, wherein the SBC sends a third SIP INVITE message to the media recorder, wherein the third SIP INVITE message includes a session identifier of the communication session.

10. The system of claim 8, wherein the second SIP INVITE message has the media attribute set to inactive.

11. The system of claim 8, wherein the second SIP INVITE message is without the media line.

12. The system of claim 8, further comprising:
    an Interactive Voice Response (IVR) system that receives one or more Dual Tone Multi-Frequency (DTMF) tones in the communication session that indicates to either start or stop recording a voice or a video communication session, and sends a SIP REINVITE message in response to receiving the one or more DTMF tones.

13. The system of claim 8, wherein the one of the SIP PUBLISH message or the SIP NOTIFY message is the SIP NOTIFY message and wherein the SBC sends a SIP SUBSCRIBE message to a recording application, wherein the SIP SUBSCRIBE message is to subscribe to a recording event for the communication session.

14. The system of claim 8, wherein the one of the SIP PUBLISH message or the SIP NOTIFY message is the SIP PUBLISH message.

15. A call recording server comprising:
    a media recording application that sends a SIP SUBSCRIBE message to be notified of an event associated with a User Agent (UA), and receives a SIP NOTIFY message that indicates the event associated with the UA; and a media recorder that receives a media stream for a communication session that includes the UA and records the media stream for the communication session.

16. The call recording server of claim 15, wherein the call recording application sends a SIP PUBLISH message that indicates whether there will be media in the communication session established between a Back-to-Back User Agent and the media recorder.

17. The call recording server of claim 16, wherein the media recording application receives a SIP INVITE message in response to sending the SIP PUBLISH message.

18. The call recording server of claim 17, wherein the SIP INVITE message is a SIP INVITE message with auto-answer.

19. The call recording server of claim 15, wherein the media recording application sends a SIP INVITE message to establish a communication session between the media recording application and a Back-to-Back User Agent (B2BUA).

20. The call recording server of claim 19, wherein the SIP INVITE message is a SIP INVITE message with auto-answer.

* * * * *